(12) United States Patent
Gould et al.

(10) Patent No.: US 9,626,393 B2
(45) Date of Patent: Apr. 18, 2017

(54) CONDITIONAL VALIDATION RULES

(71) Applicant: Ab Initio Technology LLC, Lexington, MA (US)

(72) Inventors: Joel Gould, Arlington, MA (US); Roy Procops, Winchester, MA (US)

(73) Assignee: Ab Initio Technology LLC, Lexington, MA (US)

( * ) Notice: Subject to any disclaimer, the term of this patent is extended or adjusted under 35 U.S.C. 154(b) by 148 days.

(21) Appl. No.: 14/482,374

(22) Filed: Sep. 10, 2014

(65) Prior Publication Data

US 2016/0070733 A1  Mar. 10, 2016

(51) Int. Cl.
| | |
|---|---|
| G06F 7/00 | (2006.01) |
| G06F 17/30 | (2006.01) |
| G06F 17/27 | (2006.01) |
| G06F 17/24 | (2006.01) |

(52) U.S. Cl.
CPC ...... *G06F 17/30303* (2013.01); *G06F 17/243* (2013.01); *G06F 17/246* (2013.01); *G06F 17/2725* (2013.01); *G06F 17/30371* (2013.01)

(58) Field of Classification Search
CPC .................. G06F 17/30371; G06F 17/2725
See application file for complete search history.

(56) References Cited

U.S. PATENT DOCUMENTS

| | | | |
|---|---|---|---|
| 5,630,127 A * | 5/1997 | Moore | G06N 5/022 |
| 5,758,351 A | 5/1998 | Gibson et al. | |
| 5,966,072 A | 10/1999 | Stanfill et al. | |
| 6,088,702 A * | 7/2000 | Plantz | G06F 17/24 |
| 6,494,159 B2 | 12/2002 | Sirmalis et al. | |
| 6,708,186 B1 | 3/2004 | Claborn et al. | |
| 6,948,154 B1 | 9/2005 | Rothermel et al. | |

(Continued)

FOREIGN PATENT DOCUMENTS

| | | |
|---|---|---|
| EP | 2221733 | 8/2010 |
| JP | 05-507376 | 10/1993 |

(Continued)

OTHER PUBLICATIONS

Harkins, Susan "Use Excel's Conditional Formatting to Find Errors" *TechRepublic*, pp. 1-3, Feb. 16, 2008: http://www.techrepublic.com/blog/microsoft-office/use-excels-conditional-formatting-to-find-errors/.

(Continued)

*Primary Examiner* — Charles Lu
(74) *Attorney, Agent, or Firm* — Fish & Richardson P.C.

(57) ABSTRACT

Methods, systems, and apparatus, including computer programs encoded on computer storage media, for generating conditional validation rules. One of the methods includes rendering a plurality of cells arranged in a two-dimensional grid having a first axis and a second axis, the two-dimensional grid including one or more subsets of the cells, each subset associated with a respective field of an element of the dataset, and multiple subsets of the cells extending in a direction along the second axis of the two-dimensional grid, one or more of the multiple subsets associated with a respective validation rule. The method includes applying one or more validation rules to an element of the dataset based on user input received from at least some of the cells. A condition cell associated with a field includes an input element for receiving input.

47 Claims, 3 Drawing Sheets

(56) References Cited

U.S. PATENT DOCUMENTS

| | | |
|---|---|---|
| 7,080,088 B1 | 7/2006 | Lau |
| 7,110,924 B2 | 9/2006 | Prewett et al. |
| 7,164,422 B1 | 1/2007 | Wholey, III et al. |
| 7,167,850 B2 | 1/2007 | Stanfill |
| 7,661,067 B2 | 2/2010 | Chen et al. |
| 7,689,565 B1 | 3/2010 | Gandhi |
| 7,716,630 B2 | 5/2010 | Wholey et al. |
| 7,765,529 B1 | 7/2010 | Singh et al. |
| 7,840,949 B2 | 11/2010 | Schumacher et al. |
| 7,853,553 B2 | 12/2010 | Lankinen et al. |
| 7,890,509 B1 | 2/2011 | Pearcy et al. |
| 7,895,586 B2 | 2/2011 | Ozone |
| 7,979,646 B2 | 7/2011 | Furtek et al. |
| 8,069,129 B2 | 11/2011 | Gould et al. |
| 8,423,564 B1 | 4/2013 | Hayes |
| 8,484,159 B2 | 7/2013 | Stanfill et al. |
| 8,516,008 B1 | 8/2013 | Marquardt |
| 2001/0007959 A1 | 7/2001 | Abdalla |
| 2001/0014890 A1 | 8/2001 | Liu et al. |
| 2002/0161799 A1 | 10/2002 | Maguire et al. |
| 2002/0194196 A1 | 12/2002 | Weinberg |
| 2002/0194314 A1* | 12/2002 | Kouznetsov .............. G06F 8/00 709/220 |
| 2003/0016246 A1 | 1/2003 | Singh |
| 2003/0041063 A1 | 2/2003 | Brady |
| 2003/0154191 A1 | 8/2003 | Fish |
| 2003/0163441 A1 | 8/2003 | Godfredsen |
| 2003/0163597 A1 | 8/2003 | Hellman et al. |
| 2004/0015783 A1 | 1/2004 | Lennon et al. |
| 2004/0024740 A1* | 2/2004 | McGeorge, Jr. .... G06F 17/2725 |
| 2004/0056908 A1 | 3/2004 | Bjornson et al. |
| 2004/0088318 A1* | 5/2004 | Brady .................... G06Q 10/00 |
| 2004/0225632 A1 | 11/2004 | Benson et al. |
| 2004/0225682 A1 | 11/2004 | Murman |
| 2004/0239681 A1 | 12/2004 | Robotham et al. |
| 2005/0010896 A1 | 1/2005 | Meliksetian et al. |
| 2005/0060313 A1 | 3/2005 | Naimat et al. |
| 2005/0060317 A1 | 3/2005 | Lott et al. |
| 2005/0097561 A1 | 5/2005 | Schumacher |
| 2005/0114369 A1 | 5/2005 | Gould et al. |
| 2005/0178833 A1 | 8/2005 | Kisliakov |
| 2005/0187984 A1 | 8/2005 | Chen |
| 2005/0234762 A1 | 10/2005 | Pinto et al. |
| 2005/0262121 A1 | 11/2005 | Cesare et al. |
| 2005/0289167 A1 | 12/2005 | Haselden et al. |
| 2006/0007464 A1 | 1/2006 | Percey |
| 2006/0020570 A1 | 1/2006 | Wu |
| 2006/0095466 A1 | 5/2006 | Stevens et al. |
| 2006/0200739 A1 | 9/2006 | Bhatia et al. |
| 2006/0282480 A1 | 12/2006 | Johnson |
| 2007/0011208 A1 | 1/2007 | Smith |
| 2007/0011668 A1 | 1/2007 | Wholey et al. |
| 2007/0027858 A1 | 2/2007 | Weinberg et al. |
| 2007/0050750 A1 | 3/2007 | Bykov et al. |
| 2007/0094060 A1 | 4/2007 | Apps et al. |
| 2007/0136692 A1 | 6/2007 | Seymour et al. |
| 2007/0179956 A1 | 8/2007 | Whitmyer |
| 2007/0198457 A1 | 8/2007 | Olenick et al. |
| 2007/0220022 A1 | 9/2007 | Lankinen |
| 2007/0226203 A1 | 9/2007 | Ayda et al. |
| 2007/0239751 A1 | 10/2007 | Wei et al. |
| 2007/0271381 A1 | 11/2007 | Wholey et al. |
| 2007/0276787 A1 | 11/2007 | Piedmonte |
| 2007/0294119 A1 | 12/2007 | Eicher et al. |
| 2008/0049022 A1 | 2/2008 | Sherb et al. |
| 2008/0126988 A1* | 5/2008 | Mudaliar ............... G06F 9/4443 715/825 |
| 2008/0201359 A1 | 8/2008 | Warshavsky et al. |
| 2008/0228697 A1 | 9/2008 | Ayda et al. |
| 2008/0243772 A1 | 10/2008 | Fuxman et al. |
| 2008/0243891 A1 | 10/2008 | Super et al. |
| 2008/0256014 A1 | 10/2008 | Gould et al. |
| 2008/0312979 A1 | 12/2008 | Lee et al. |
| 2008/0313204 A1 | 12/2008 | Schultz et al. |
| 2009/0037488 A1 | 2/2009 | Abrams |
| 2009/0063515 A1 | 3/2009 | Bar-Or et al. |
| 2009/0083313 A1 | 3/2009 | Stanfill et al. |
| 2009/0094291 A1 | 4/2009 | Yalamanchi |
| 2009/0234623 A1* | 9/2009 | Germain ................. E21B 41/00 703/6 |
| 2009/0319494 A1 | 12/2009 | Gooder |
| 2009/0327196 A1 | 12/2009 | Studer et al. |
| 2010/0100220 A1 | 4/2010 | Belanger et al. |
| 2010/0114833 A1 | 5/2010 | Mu |
| 2010/0121890 A1 | 5/2010 | Perkins et al. |
| 2010/0138388 A1 | 6/2010 | Wakeling et al. |
| 2010/0145914 A1 | 6/2010 | Kanno et al. |
| 2010/0198769 A1 | 8/2010 | Gould et al. |
| 2010/0223218 A1 | 9/2010 | Prendergast |
| 2011/0061057 A1 | 3/2011 | Harris et al. |
| 2011/0066602 A1 | 3/2011 | Studer et al. |
| 2011/0145297 A1* | 6/2011 | Singh ................ G06F 17/30572 707/802 |
| 2011/0276789 A1 | 11/2011 | Chambers et al. |
| 2011/0295863 A1 | 12/2011 | Weir et al. |
| 2012/0054164 A1 | 3/2012 | Falkebo et al. |
| 2012/0102029 A1 | 4/2012 | Larson et al. |
| 2012/0158625 A1 | 6/2012 | Nelke et al. |
| 2012/0167112 A1 | 6/2012 | Harris et al. |
| 2012/0185449 A1 | 7/2012 | Gould et al. |
| 2012/0310905 A1* | 12/2012 | Hans ................ G06F 17/30507 707/694 |
| 2013/0166515 A1 | 6/2013 | Kung |
| 2014/0108357 A1 | 4/2014 | Procops |

FOREIGN PATENT DOCUMENTS

| | | |
|---|---|---|
| JP | 07-044368 | 2/1995 |
| JP | H11-143755 | 5/1999 |
| JP | 2006-277624 | 10/2006 |
| JP | 2008-524671 | 7/2008 |
| JP | 2008-547134 | 12/2008 |
| WO | 2010/056867 | 5/2010 |
| WO | 2010/065511 | 6/2010 |

OTHER PUBLICATIONS

International Search Report & Written Opinion issued in PCT application No. PCT/US09/66210, mailed Jan. 27, 2010, 8 pages.

International Search Report & Written Opinion issued in PCT application No. PCT/US10/49142, dated Nov. 5, 2010, 11 pages.

International Search Report & Written Opinion issued in PCT application No. PCT/US2011/057623, dated Jan. 25, 2012, 13 pages.

International Search Report & Written Opinion issued in PCT application No. PCT/US2012/021286, dated May 4, 2012, 15 pages.

International Search Report & Written Opinion issued in PCT application No. PCT/US2013/064979, mailed Nov. 28, 2013, 11 pages.

Japanese Office Action issued in JP2012-529903, dated Aug. 7, 2014, 4 pages (English Translation).

Japanese Office Action issued in JP2011-539631, dated Oct. 24, 2013, 3 pages (English Translation).

Liskin, Miriam "Microsoft Access 97 for Windows SuperGuide" *Ziff-Davis Press*, Jan. 1, 1997, ch. 4 & 15, pp. 117-157 and 687-739.

Melia, Mark et al., "Constraint-Based Validation of Adaptive e-Learning Courseware," IEEE Transactions on Learning Technologies, vol. 2, No. 1, Jan.-Mar. 2009, pp. 37-49.

Rull, Guillem et al., "MVT: A Schema Mapping Validation Tool," EDBT'09, Mar. 24-26, 2009, pp. 1120-1123.

Van Megen, Rudolf et al., "Costs and benefits of early defect detection: experiences from developing client server and host applications," Software Quality Journal 4, 247-256 (1995).

Chaiken et al., "Xope: easy and efficient parallel processing of massive data sets," J. Proc. of the VLDB Endowment Homepagearchive, vol. I, No. 2, (2008), pp. 1265-1276.

Pinheiro et al., "Mobile agents for aggregation of network management data," Agent Systems and Applications, (1999) pp. 130-140.

Transaction History, U.S. Appl. No. 12/628,521, filed Mar. 25, 2016 (3 pages).

(56) References Cited

OTHER PUBLICATIONS

Transaction History, U.S. Appl. No. 12/883,721, filed Mar. 25, 2016 (5 pages).
Transaction History, U.S. Appl. No. 13/281,039, filed Mar. 25, 2016 (3 pages).
Transaction History, U.S. Appl. No. 13/350,191, filed Mar. 25, 2016 (3 pages).
Transaction History, U.S. Appl. No. 13/653,995, filed Mar. 25, 2016 (3 pages).
Transaction History, U.S. Appl. No. 13/950,826, filed Mar. 25, 2016 (2 pages).
International Search Report and Written Opinion issued in PCT/US2015/049131, dated Nov. 26, 2015, 14 pages.
Japanese Office Action issued in JP 2012-529903, dated Aug. 7, 2014, 4 pages (English Translation).

\* cited by examiner

| Field | Conditions | Pattern | Valid Values |
|---|---|---|---|
| Postal_Code | Country="US" | (99999)\|(99999-9999) | |
| Postal_Code | Country="CA" | A9A 9A9 | |
| Postal_Code | Country="UK" | A((A9)\|9)(A\|9)? 9AA | |
| Postal_Code | Else | (99999)\|(99999-9999) | |
| Country | | | "US","CA","UK" |

306 → table
308 → Postal_Code (US) row
310 → Postal_Code (CA) row
312 → Postal_Code (UK) row
314 → Postal_Code (Else) row
316 → Country row

CONDITIONAL VALIDATION RULES

BACKGROUND

This description relates to specifying and applying rules to data.

Many modern applications, including business applications, process large sets of data (i.e., "datasets") which can be compiled from various sources. The various sources that provide data to the dataset can have different levels of data quality. To ensure that the applications function properly, an adequate level of data quality in the dataset should be maintained. To maintain an adequate level of data quality, the dataset can be processed by a data validation system. Such a system applies validation rules to the dataset before it is provided to the application. In some examples, the data validation system uses the results of validation rules to calculate a measure of data quality and alert an administrator of the application if the measure of data quality falls below a predetermined threshold. In other examples, the data validation system includes modules for handling data that fails one or more of the validation rules. For example, the data validation system can discard or repair data that fails one or more of the validation rules.

In general, the validation rules applied by the data validation system are defined by an administrator of the data validation system.

SUMMARY

In general, one innovative aspect of the subject matter described in this specification can be embodied in an aspect 1 that include a system that includes processors and processing instructions, including a user interface module configured to render a plurality of cells arranged in a two-dimensional grid having a first axis and a second axis, the two-dimensional grid including one or more subsets of the cells extending in a direction along the first axis of the two-dimensional grid, each subset of the one or more subsets associated with a respective field of an element of the plurality of elements of the dataset, and multiple subsets of the cells extending in a direction along the second axis of the two-dimensional grid, one or more of the multiple subsets associated with a respective validation rule. The method includes rendering a subset of the cells extending in a direction along the second axis of the two-dimensional grids, each cell in the subset being associated with the respective field at the corresponding position in the grid identified by the second axis, and being capable of being used as a conditional cell. A condition cell associated with a field includes an input element, for receiving input in the form of a conditional expression. A processing module configured to evaluate a conditional expression from a condition cell and, based on that evaluation, apply one or more validation rules to at least one element of the dataset.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or causes the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination.

An aspect 2 according to aspect 1 includes that the input element may receive a condition such that at least one validation rule associated with the second axis is applied to the associated field when the condition is satisfied.

An aspect 3 according to aspects 1 or 2 include that the condition may be dependent on a value of a second field different from the associated field.

An aspect 4 according to aspects 1, 2, and 3 includes applying validation rules to data in a first field of a first element of the dataset including determining selected validation rules associated with cells from a subset of cells extending in the direction along the second axis associated with the first field of the first element, based on any input received in the input elements of the cells; determining a condition associated with the selected validation rules based on input received in an input element of a condition cell associated with the first field; determining that the condition is satisfied; and applying the selected validation rules to the first field.

An aspect 5 according to aspects 1, 2, 3, or 4 includes that the input element of the condition cell may be configured to receive an operator and a value associated with the operator.

An aspect 6 according to aspects 1, 2, 3, 4 or 5 includes that determining that the condition is satisfied may include applying the operator to the value associated with the operator and a value in a second field of the first element of the dataset, the second field being identified by the field identifier.

Aspects of the disclosed system can have one or more of the following advantages. A user interface can enable a business user to identify validation rules. The application of a validation rule can be conditional on the value of a field in a data element. Validating a dataset can increase the performance of application using that dataset. Conditional validation rules can improve system performance by bypassing the unnecessary application of validation rules. Conditional validation rules can reduce system complexity, but allowing specific validation rules to be easily applied for uncommon test cases.

Other features and advantages of the invention will become apparent from the following description and the claims.

DESCRIPTION OF DRAWINGS

FIG. 3 illustrates an example of a conditional validation rule.

DESCRIPTION

Data processing systems accept data from different sources and produce outputs based on the data. The data processed by the system can include anomalies, errors, or issues. These data quality problems can be due to, for example, errors caused by inaccurate entry, such as typographical errors, machine failures, such as data corruption, and errors caused by translation errors, such as an incorrect identification of the encoding of the data. Errors can also be due to missing or unreported data, improperly formatted data, change in specification at data producer that results in misinterpreted data at data consumer, errors in reference code sets resulting in mismatches with data, synchronization problems (e.g. new reference data fails to appear on time and source data does not match older reference data), introduction of new code values, etc. In general, a goal of data quality system is to detect issues in the data that need to be measured, usually as part of a data improvement program (number of issues should go down over time).

Data validation is the process of measuring the quality of the data. In general, one or more data validation tests are executed against a data source. Quality of the data is quantified and, if necessary, action can be taken to improve the quality of the data.

A user interface can simplify the process of creating a validation rule. In general, a validation rule is a set of one or more validation tests that can be applied to data to determine the data quality. For example, a validation rule may include a validation test that determines whether a field of data is of a particular data type and a validation test that determines whether a field of data is of a particular size. The systems, methods, and mediums described herein have at least some of the following advantages over the prior art. A user interface can enable a business user to identify validation rules. Logical rules can be associated with business terms. Fields in a dataset can also be associated with business terms. Default validation rules can be determined based on the associations. Logical rules can decrease the time spent validating a data set. Another useful reference point is a system for specifying and applying rules to data is described in U.S. patent application Ser. No. 13/653,995, entitled "SPECIFYING AND APPLYING RULES TO DATA" and filed Oct. 17, 2012, the contents of which are incorporated by reference.

A business term represents a concept that is embodied in the data. For example, a relational database table named "cust_tbl" may include a field named "phone_no." A row in the "cust_tbl" with a value in the "phone_no" field represents that a customer exists with that particular phone number. In this example, "customer" is a business term embodied in, at least, the "cust_tbl" and "phone number" is a business term embodied in the "phone_no" field.

Figure 1:
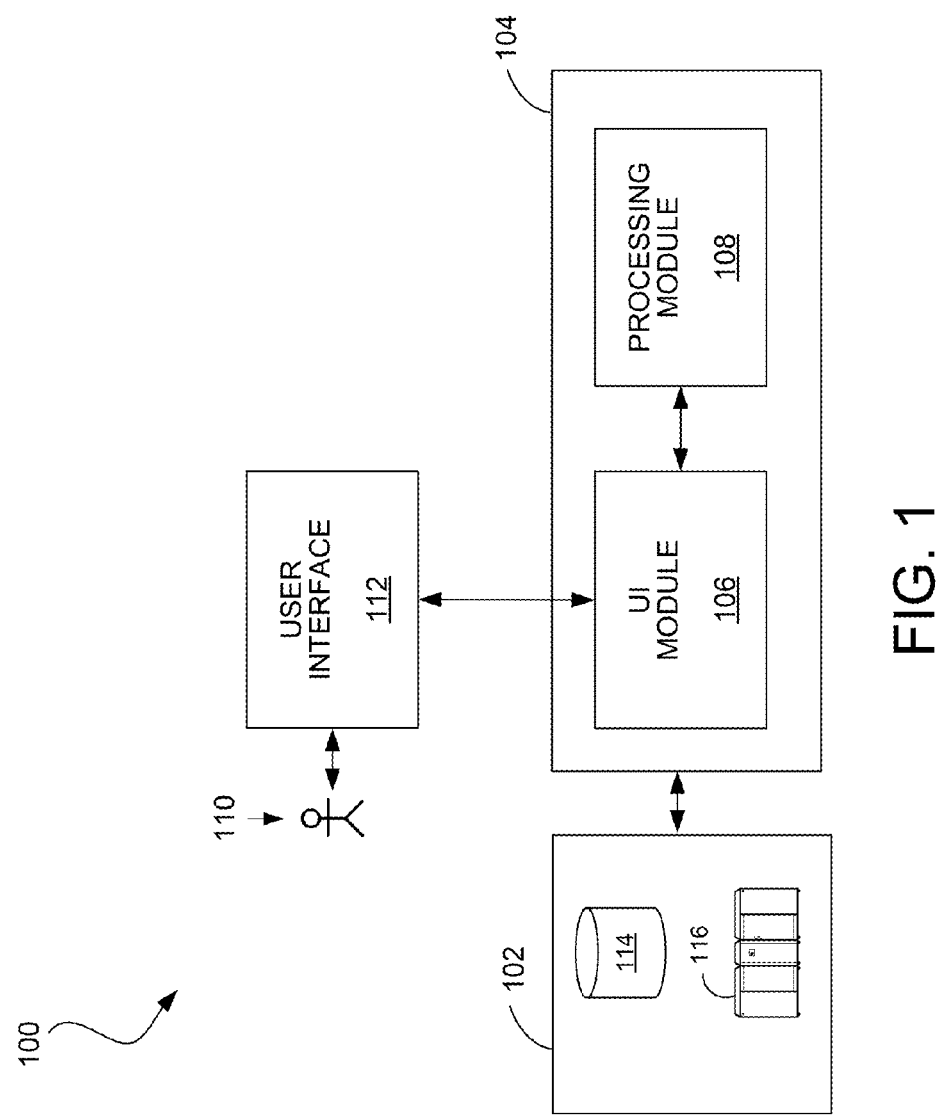
FIG. 1 shows an exemplary data processing system in which the conditional techniques can be used.

FIG. 1 shows an exemplary data processing system 100 in which the conditional techniques can be used. The system 100 includes a data source 102. The data source 102 can include one or more sources of data such as storage devices or connections to online data streams, each of which can store data (sometimes referred to as a "dataset") in any of a variety of storage formats (e.g., database tables, spreadsheet files, flat text files, or a native format used by a mainframe).

The execution environment 104 can be hosted on one or more general-purpose computers under the control of a suitable operating system, such as UNIX. For example, the execution environment 104 can include a multiple-node parallel computing environment: this can include configuration of computer systems using multiple central processing units (CPUs); either local (e.g., multiprocessor systems such as SMP computers) or locally distributed processors (e.g., multiple processors coupled as clusters or MPPs); remote or remotely distributed processors (e.g., multiple processors coupled via a local area network (LAN) and/or wide-area network (WAN)); or any combination thereof.

The execution environment includes a user interface (UI) module 106 and a processing module 108. The UI module 106 manages input received from a user 110 over a user interface 112 (e.g., a graphical view on a display screen) which is utilized in specifying validation rules to be used by the processing module 108 for processing data from the data source 102.

The processing module 108 reads data from the data source 102 and performs validation procedures based on validation information obtained by the UI module 106. Storage devices providing the data source 102 can be local to the execution environment 104, for example, being stored on a storage medium connected to a computer running the execution environment 104 (e.g., hard drive 114). Alternatively or additionally, the storage devices can be remote to the execution environment 104, for example, being hosted on a remote system (e.g., mainframe 116) in communication with a computer running the execution environment 104, over a remote connection.

In general, a dataset accessed from the data source 102 includes a number of data elements, which can be records formatted according to a predetermined record structure, or rows in a database table. Each data element can include values for a number of fields, for example, attributes defined within a record structure or columns in a database table, possibly including null or empty values. Various characteristics of values in the fields or the presence or absence of values in certain fields can be considered valid or invalid. For example, a "last_name" field including the string "Smith" may be considered valid, while a "last_name" field that is blank may be considered invalid. The conditions that determine whether a field is valid or invalid can be different for different fields. For example, a "middle_name" field including the string "Randolf" may be considered valid and a "middle_name" field that is blank may also be considered valid.

In general, fields in a dataset can represent a physical representation of a business rule. For example, a "first_name" field (which may for example, be a variable-length character string stored in a relational database) in a "customer" data set may include data that is the first name of a customer and therefore is associated with a business term "first name". That is, the character string "John" in the "first_name" field of a data element of the customer data set represents the existence of a business customer with the given name "John." Other datasets may represent the same business concept in different ways. For example, a second dataset can include the field "fname" which may also correspond to the business term "first name."

Figure 2:
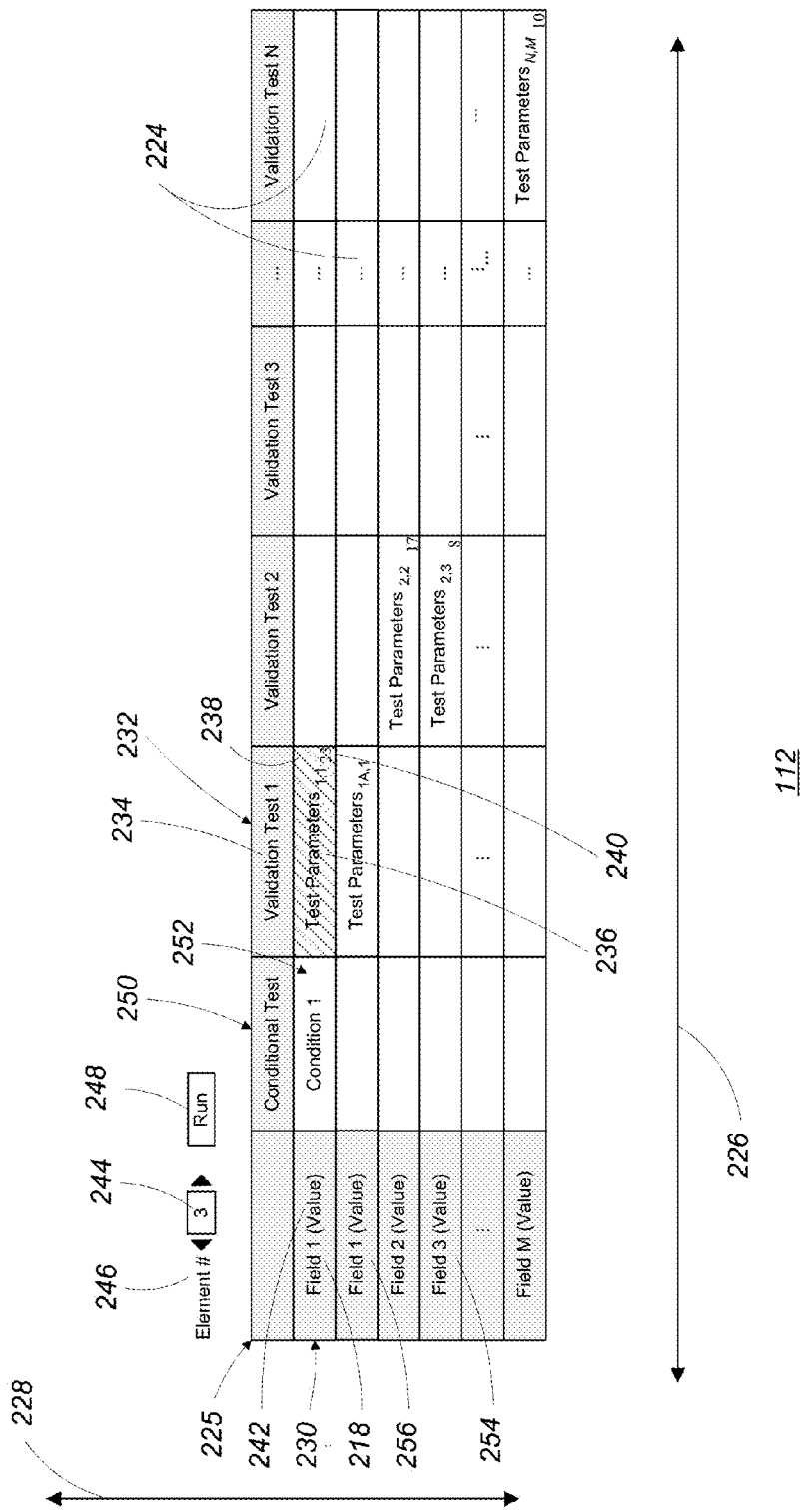
FIG. 2 is an example of a user interface for specifying validation rules for conditionally validating data elements in a data set.

FIG. 2 is an example of a user interface 112 for specifying validation rules for conditionally validating data elements in a data set. The user interface 112 is configured to facilitate the user 110 specifying and verifying one or more conditional validation rules. In general, a validation rule may include one or more validation tests, each of the validation tests may require the application of another validation rule. Some validation tests may be conditional on values in the data elements of the data set.

The UI module 106 renders the user interface 112. The user interface 112 may be rendered, for example, on a computer monitor. The user interface 112 includes a number of cells 224 arranged in a two-dimensional grid 225 with a first axis 226 and a second axis 228. One or more subsets 230 of the cells 224, (referred to as rows 230 in the remainder of the detailed description) extends in a direction along the first axis 226 of the two-dimensional grid 225. Each of the rows 230 is associated with a field 218. In some arrangements, the first (i.e., leftmost) cell of each of the rows 230 includes the name of the data element 218 associated with the row 230. In this example, the first cells of each row include the data element names "Field 1," "Field 2," . . . "Field M".

Multiple subsets 232 of the cells 224 (referred to as columns 232 in the remainder of the detailed description) extend along the second axis 228. One or more of the columns 232 is associated with a validation test 234. The columns 232 can include a "conditions" column 250 that identifies circumstances under which the validations rules associated with the data element (identified by the row) are applied. In some examples, the first (i.e., the topmost) cell of each of the remaining columns 232 includes the name of the validation test 234 associated with the column, or a name such as "Conditional Test" or "Conditions" for the conditions column 250. In this example, the validation rule names are "Validation Test 1," "Validation Test 2," . . . "Validation Test N". It is noted that in some examples, the directions of the first axis 226 and the second axis 228 can be swapped, causing the rows 230 associated with the fields 218 to become columns and the columns 232 associated with the validation test 234 to become rows.

After one or more validation test columns 232 are added to the two-dimensional grid 225, the user 110 can specify which validation test 234 should be applied to which data elements 218. An example, of different kinds of validation tests that can be specified is described in U.S. Pat. No. 8,069,129 entitled "EDITING AND COMPILING BUSINESS RULES", incorporated herein by reference.

The user interface 112 includes a condition column 250 that allows the user to establish a pre-condition for testing the validation rules for a given row. The user may specify that "Condition 1" 252 should be met before applying "Validation Test 1" with Test Parameters$_{1,1}$ 236 to the data element "Field 1" 218.

The condition can refer to a data element that may or may not be the subject of the validation. For example, the condition may require that a field in the data element have a value that matches a predetermined value, is included in a range or set of possible values, or matches a provided regular expression. The field may or may not be the field that is the subject of the validation test. For example, condition 1 252 may test the value of Field 3 254 before applying Validation Test 1 234 to the value of Field 1 218. The condition can require that a data element have a value (for example, the data element does not include a null value indicator.) In some implementations, conditions can be data driven. For example, data driven conditions can include record of a certain type, accounts in a certain range, countries in a set of values. The conditions may involve lookup files or referencing data in another input file or database table.

In some implementations, establishing a condition can include identifying a field, an operation, and a value. The operation can be, for example, a Boolean function. The field identifies which data element is going to be evaluated by the condition, the operation identifies how the field is going to be evaluated, and a value is used to determine whether the condition is satisfied based on the evaluation. For example, for the condition:

Country='US' the field is Country, the operator is '=', and the value is 'US'. The condition is satisfied is a value in a country field for the data element is equal to 'US', and the condition is not satisfied if the value is not 'US'.

In some implementations, when a user adds a condition to a field the user interface automatically creates a new validation test row for that field. For example, in response to the addition of the condition 252 to Field 1 218 the user interface inserts a new row 256. Multiple rows in the user interface that each refer to the same Field may be evaluated sequentially, that is from top to bottom. A field in the data element being validated fails the validation rule if it fails any validation test that the system determines should be applied. For example, if the system determines that Condition 1 252 is satisfied and applies Validation Test 1 234 with Test Parameters$_{1,1}$ 236 to the value in the data element and that value does not meet the validation test then the field of the data element fails and the failure counter 240 is incremented.

In some implementations, once a field passes any of the conditional tests, no subsequent validation tests are applied to that field. For example, if the system determines that validate test 1 252 is satisfied then validation test 256 would not be applied.

In other implementations, each validation rule for which the conditions are met is applied. In some implementations, the system may designate a final validation rule as an catchall validation rule that is only executed if no other validation rule is applied to the field. In some implementations, a user may designate a validation rule as an catchall validation rule by supplying a predetermined condition, for example, by using a keyword (such as "else") in the condition test column. In general, a catchall validation rule is a validation rule that executes on a field if and only if no other validation rule has executed for that field. In some implementations, whenever a conditional is used for a field, a catchall is provided for that field automatically.

In some implementations, a validation rule set may include multiple different condition tests that are each associated with one or more validation rules. For example, a business rule may have one set of validation rules that are applied when country code is 'US' and another set of one or more validation rules that are applied when the state code is "MA". And other set of validation rules may be applied when the last name begins with a "W."

In some implementations, only a single condition will be triggered for a given validation rule set, for example, after a single condition is true, the associated one or more validation rules are applied and then the validation rule set ends.

In other implementations, each condition is tested and all of the validation rules associated with any triggered condition are applied.

In some implementations, a validation rule set can include conditional validation rules and non-conditional validation rules. The non-conditional validation rules can be applied whether or not any condition is triggered.

FIG. 3 illustrates an example of a conditional validation rule. A user interface 300, which can be, for example, the user interface 212 of FIG. 2, include a table 306 defines the validation rules for the "Postal_Code" field.

The first validation 308 indicates that if the country is "US" then the postal code must be of the format "(99999)|(99999-9999)." The second validation 310 indicates that if the country is "CA" then the postal code must be of the format "A9A 9A9". The third validation 312 indicates that if the country is "UK" then the postal code must be of the format "A((A9)|9)(A|9)? 9AA." A fourth validation 314 is a catchall provision as designated by the condition "Else." In this example, the fourth validation rule tests that the postal code is of the format "(99999)|(99999-9999)."

The user interface 300 also includes a fifth validation 316 that determines whether the country field contains one of the values "US", "CA", UK".

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software can be provided on a storage medium, such as a CD-ROM, readable by a general or special purpose programmable computer, or delivered (encoded in a propagated signal) over a communication medium of a network to a storage medium of the computer where it is executed. All of the functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications can be made without departing from the spirit and scope of the invention. For example, some of the steps described above can be order independent, and thus can be performed in an order different from that described.

It is to be understood that the foregoing description is intended to illustrate and not to limit the scope of the invention, which is defined by the scope of the appended claims. For example, a number of the function steps described above can be performed in a different order without substantially affecting overall processing. Other embodiments are within the scope of the following claims.

What is claimed is:

1. A computing system for specifying one or more validation rules for validating data included in one or more fields of elements of a plurality of elements of a dataset, the computing system including:
   a processor; and
   a memory in communication with the processor, the memory storing an execution environment, the execution environment comprising:
      a processing module configured to evaluate a conditional expression and determine whether to apply one or more validation rules to at least one element of a dataset; and
      a user interface module that generates a user interface that renders a plurality of cells and that configures validation rules with validation parameters, the cells arranged in a two-dimensional grid that comprises:
         one or more first subsets of the cells extending in a first direction of the two-dimensional grid, each first subset associated with a respective field of an element of the plurality of elements of the dataset;
         second subsets of the cells extending in a second, different direction of the two-dimensional grid, with the second subsets associated with a respective validation rule; and
         a set of condition cells having an input element that receives a conditional expression that includes an operation and a value, the set of condition cells extending in the second direction of the two-dimensional grid, with cells in the set of condition cells being associated with one or more respective fields;
   with the processing module configured to:
      apply one or more validation rules to at least one field of an element of a dataset according to the value in a given one of the condition cells, with the given one of the condition cells having a given conditional expression to satisfy, with satisfaction of the given conditional expression causing application of a validation rule associated with the given one of the condition cells to the at least one field that includes the entered value.

2. The system of claim 1, wherein the input element receives a condition such that at least one validation rule associated with the one or more respective fields is applied to the associated field when the condition is satisfied.

3. The system of claim 1, wherein the condition is dependent on a value of a second field different from the associated field.

4. The system of claim 1, further including applying validation rules to data in a first field of a first element of the dataset including:
   determining a condition associated with selected validation rules based on input received in an input element of a condition cell associated with the first field;
   determining that the condition is satisfied; and
   applying the selected validation rules to the first field.

5. The system of claim 4, wherein the input element of the condition cell is configured to receive an operator and a value associated with the operator.

6. The system of claim 5, wherein determining that the condition is satisfied includes:
   applying the operator to the value associated with the operator and a value in a second field of the first element of the dataset, the second field being identified by the field identifier.

7. A computer implemented method including:
   rendering a plurality of cells arranged in a two-dimensional grid including:
      one or more first subsets of the cells extending in a first direction of the two-dimensional grid, each first subset associated with a respective field of an element of a plurality of elements of a dataset;
      second subsets of the cells extending in a second, different direction of the two-dimensional grid, with the second subsets associated with a respective validation rule; and
      a set of condition cells having an input element that receives a conditional expression that includes an operation and a value, the set of condition cells extending in the second direction of the two-dimensional grid, with cells in the set of condition cells being associated with one or more respective fields; and applying one or more validation rules to at least one field of an element of the dataset according to a value entered into a given one of the condition cells, with the given one of the condition cells having a given conditional expression to satisfy by the entered value, with satisfaction of the given conditional expression causing application of a validation rule associated with the given one of the condition cells to the at least one field that includes the entered value.

8. The method of claim 7, wherein the input element receives a condition such that at least one validation rule associated with the one or more respective fields is applied to the associated field when the condition is satisfied.

9. The method of claim 7, wherein the condition is dependent on a value of a second field different from the associated field.

10. The method of claim 7, further including applying validation rules to data in a first field of a first element of the dataset including:
   determining a condition associated with selected validation rules based on input received in an input element of a condition cell associated with the first field;
   determining that the condition is satisfied; and
   applying the selected validation rules to the first field.

11. The method of claim 7, wherein the input element of the condition cell is configured to receive an operator and a value associated with the operator.

12. The method of claim 11, wherein determining that the condition is satisfied includes:
   applying the operator to the value associated with the operator and a value in a second field of the first element of the dataset, the second field being identified by the field identifier.

13. A computer storage medium encoded with computer program instructions that when executed by one or more computers cause the one or more computers to:
   render a plurality of cells arranged in a two-dimensional grid, the two-dimensional grid including:
      one or more first subsets of the cells extending in a first direction of the two-dimensional grid, with each first subset associated with a respective field of an element of a plurality of elements of a dataset;
      second subsets of the cells extending in a second, different direction of the two-dimensional grid, with the second subsets associated with a respective validation rule; and
      a set of condition cells having an input element that receives a conditional expression that includes an operation and a value, the set of condition cells extending in the second direction of the two-dimensional grid, with cells in the set of condition cells being associated with one or more respective fields; and
   apply one or more validation rules to at least one field of an element of the dataset according to the value in a given one of the condition cells, with the given one of the condition cells having a given conditional expression to satisfy, with satisfaction of the given conditional expression causing application of a validation rule associated with the given one of the condition cells to the at least one field that includes the entered value.

14. The medium of claim 13, wherein the input element receives a condition such that at least one validation rule associated with the one or more respective fields is applied to the associated field when the condition is satisfied.

15. The medium of claim 13, wherein the condition is dependent on a value of a second field different from the associated field.

16. The medium of claim 13, further including applying validation rules to data in a first field of a first element of the dataset including:
   determining a condition associated with selected validation rules based on input received in an input element of a condition cell associated with the first field;
   determining that the condition is satisfied; and
   applying the selected validation rules to the first field.

17. The medium of claim 16, wherein the input element of the condition cell is configured to receive an operator and a value associated with the operator.

18. The medium of claim 17, wherein determining that the condition is satisfied includes:
   applying the operator to the value associated with the operator and a value in a second field of the first element of the dataset, the second field being identified by the field identifier.

19. A computing system including:
   a display device to render a plurality of cells arranged in a two-dimensional grid, the two-dimensional grid including:
      first subsets of the cells extending in a first direction of the two-dimensional grid, each first subset of the first subsets associated with a respective field of an element of a plurality of elements of a dataset, and
      second subsets of the cells extending in a second, different direction of the two-dimensional grid, with the second subsets associated with a respective validation rule;
      a set of condition cells, each condition cell having an input element that receives a conditional expression that identifies a field and includes an operation and a value; and
   a processor device and memory operatively coupled to the processor device to:
      apply one or more validation rules to at least one field of an element of a dataset according to the value in a given one of the condition cells, with the given one of the condition cells having a given conditional expression to satisfy, with satisfaction of the given conditional expression causing application of a validation rule associated with the given one of the condition cells to the at least one field that includes the entered value.

20. The computing system of claim 1, wherein a plurality of condition cells in the set of condition cells is associated with a particular field of an element.

21. The computing system of claim 20, wherein each of the condition cells in the plurality is associated with at least one cell in a second subset of cells that is associated with a particular validation rule.

22. The computing system of claim 21, wherein the at least one cell in the second subset of cells is a first cell and wherein the particular validation rule is a first validation rule,
   wherein a condition cell in the plurality is associated with the first cell and is further associated a second cell in another second subset of cells that is associated with a second validation rule.

23. The computing system of claim 1, wherein a first subset of the cells is on a periphery of the two-dimensional grid.

24. The computing system of claim 1, wherein a second subset of the cells is on a periphery of the two-dimensional grid.

25. The computing system of claim 1, wherein the two-dimensional grid further comprises a plurality of interior cells juxtaposed between the one or more first subsets the and the second subsets of the cells for configuring corresponding validation rules.

26. The computing system of claim 25, with the set of condition cells being corresponding ones of the plurality of interior cells that are juxtaposed to at least one of the second subsets.

27. The computer-implemented method of claim 7, wherein a plurality of condition cells in the set of condition cells is associated with a particular field of an element.

28. The computer-implemented method of claim 27, wherein each of the condition cells in the plurality is associated with at least one cell in a second subset of cells that is associated with a particular validation rule.

29. The computer-implemented method of claim 28, wherein the at least one cell in the second subset of cells is a first cell, and wherein the particular validation rule is a first validation rule,
wherein a condition cell in the plurality is associated with the first cell and is further associated a second cell in another second subset of cells that is associated with a second validation rule.

30. The computer-implemented method of claim 7, wherein a first subset of the cells is on a periphery of the two-dimensional grid.

31. The computer-implemented method of claim 7, wherein a second subset of the cells is on a periphery of the two-dimensional grid.

32. The computer-implemented method of claim 7, wherein the two-dimensional grid further comprises a plurality of interior cells juxtaposed between the one or more first subsets the and the second subsets of the cells for configuring corresponding validation rules.

33. The computer-implemented method of claim 32, with the set of condition cells being corresponding ones of the plurality of interior cells that are juxtaposed to at least one of the second subsets.

34. The medium of claim 13, wherein a plurality of condition cells in the set of condition cells is associated with a particular field of an element.

35. The medium of claim 34, wherein each of the condition cells in the plurality is associated with at least one cell in a second subset of cells that is associated with a particular validation rule.

36. The medium of claim 35, wherein the at least one cell in the second subset of cells is a first cell, and wherein the particular validation rule is a first validation rule,
wherein a condition cell in the plurality is associated with the first cell and is further associated a second cell in another second subset of cells that is associated with a second validation rule.

37. The medium of claim 13, wherein a first subset of the cells is on a periphery of the two-dimensional grid.

38. The medium of claim 13, wherein a second subset of the cells is on a periphery of the two-dimensional grid.

39. The medium of claim 13, wherein the two-dimensional grid further comprises a plurality of interior cells juxtaposed between the one or more first subsets the and the second subsets of the cells for configuring corresponding validation rules.

40. The medium of claim 37, with the set of condition cells being corresponding ones of the plurality of interior cells that are juxtaposed to at least one of the second subsets.

41. The computing system of claim 19, wherein a plurality of condition cells in the set of condition cells is associated with a particular field of an element.

42. The computing system of claim 41, wherein each of the condition cells in the plurality is associated with at least one cell in a second subset of cells that is associated with a particular validation rule.

43. The computing system of claim 42, wherein the at least one cell in the second subset of cells is a first cell and wherein the particular validation rule is a first validation rule,
wherein a condition cell in the plurality is associated with the first cell and is further associated a second cell in another second subset of cells that is associated with a second validation rule.

44. The computing system of claim 19, wherein a first subset of the cells is on a periphery of the two-dimensional grid.

45. The computing system of claim 19, wherein a second subset of the cells is on a periphery of the two-dimensional grid.

46. The computing system of claim 19, wherein the two-dimensional grid further comprises a plurality of interior cells juxtaposed between the one or more first subsets the and the second subsets of the cells for configuring corresponding validation rules.

47. The computing system of claim 46, with the set of condition cells being corresponding ones of the plurality of interior cells that are juxtaposed to at least one of the second subsets.

* * * * *

UNITED STATES PATENT AND TRADEMARK OFFICE
CERTIFICATE OF CORRECTION

PATENT NO. : 9,626,393 B2
APPLICATION NO. : 14/482374
DATED : April 18, 2017
INVENTOR(S) : Joel Gould and Roy Procops Page 1 of 2

It is certified that error appears in the above-identified patent and that said Letters Patent is hereby corrected as shown below:

In the Claims

Column 10, Line 62, Claim 22, after "associated" insert -- with --;

Column 11, Lines 6-7, Claim 25, delete "the and the" and insert -- and the --;

Column 11, Line 13, Claim 27, delete "computer-implemented" and insert -- computer implemented --;

Column 11, Line 16, Claim 28, delete "computer-implemented" and insert -- computer implemented --;

Column 11, Line 20, Claim 29, delete "computer-implemented" and insert -- computer implemented --;

Column 11, Line 25, Claim 29, after "associated" insert -- with --;

Column 11, Line 28, Claim 30, delete "computer-implemented" and insert -- computer implemented --;

Column 11, Line 31, Claim 31, delete "computer-implemented" and insert -- computer implemented --;

Column 11, Line 34, Claim 32, delete "computer-implemented" and insert -- computer implemented --;

Column 11, Line 37, Claim 32, delete "the and the" and insert -- and the --;

Column 11, Line 39, Claim 33, delete "computer-implemented" and insert -- computer implemented --;

Signed and Sealed this
Fifth Day of May, 2020

Andrei Iancu
*Director of the United States Patent and Trademark Office*

Column 12, Line 5, Claim 36, after "associated" insert -- with --;

Column 12, Line 13, Claim 39, delete "the and the" and insert -- and the --;

Column 12, Line 32, Claim 43, after "associated" insert -- with --;

Column 12, Line 43, Claim 46, delete "the and the" and insert -- and the --.